US005139597A

United States Patent [19]

Walter et al.

[11] Patent Number: 5,139,597

[45] Date of Patent: Aug. 18, 1992

[54] DETACHER TO FOLDER OR PRESSURE SEALER SHINGLE CONVEYOR

[75] Inventors: George E. Walter, Tonawanda; John E. Traise, Niagara Falls, both of N.Y.

[73] Assignee: Moore Business Forms, Inc., Grand Island, N.Y.

[21] Appl. No.: 604,858

[22] Filed: Oct. 26, 1990

[51] Int. Cl.$^5$ .............................................. B32B 31/16

[52] U.S. Cl. ................................ 156/226; 156/308.4; 156/548; 156/558; 271/251

[58] Field of Search ..................... 156/701, 226, 308.4, 156/548, 552, 563, 556, 558; 271/251

[56] References Cited

U.S. PATENT DOCUMENTS

| | | | |
|---|---|---|---|
| 4,373,986 | 2/1983 | Cone | 156/552 |
| 4,461,661 | 7/1984 | Fabel | 156/108 |
| 4,818,332 | 4/1989 | Schultz et al. | 156/558 |
| 4,875,965 | 10/1989 | Marzullo | 156/443 |

*Primary Examiner*—Robert A. Dawson

*Assistant Examiner*—David Reifsnyder

*Attorney, Agent, or Firm*—Nixon & Vanderhye

[57] ABSTRACT

A distinct conveyor assembly allows a business form sealer—such as a pressure sealer—to operate with forms that have been detached from a continuous supply. Individual forms are detached from the continuous supply while being conveyed in a first direction, to form shingled forms having irregularly positioned side edges. The forms are deshingled by conveying them from the detacher at high speed (e.g. an increase in speed of about ten times or more), and they are registered while being conveyed in the first direction at high speed. Registration may take place by moving the forms against one side edge, or moving them between funnelled side edges to ultimately engage straight guides on both side edges. After registration, the forms may be fed directly to the sealer, or into the top of a hopper, and then withdrawn from the bottom of the hopper and passed through a folder before being fed to the sealer.

9 Claims, 3 Drawing Sheets

FIG. 1
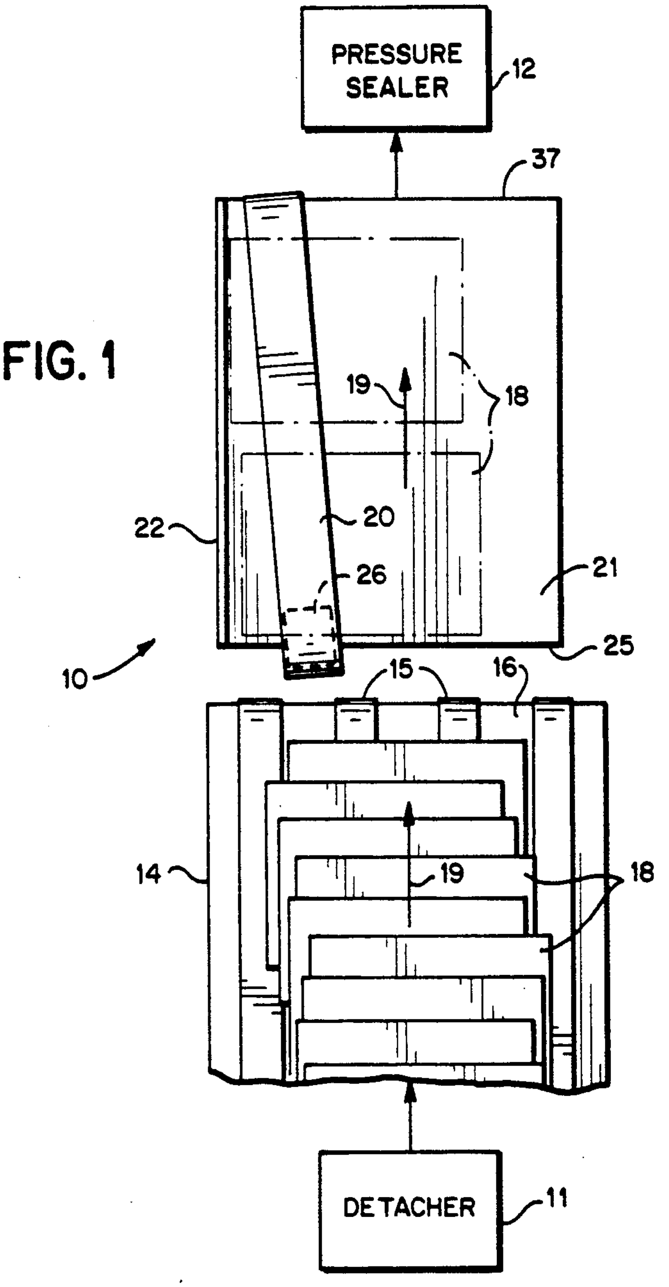
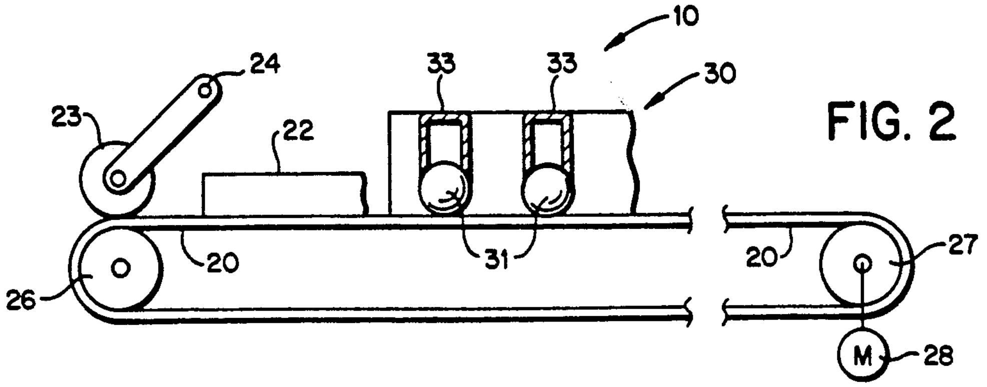
FIG. 2

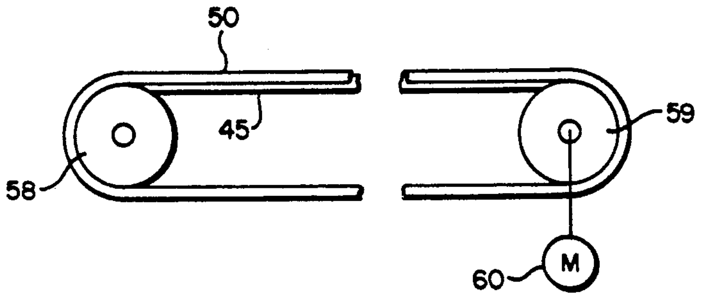
FIG. 5
FIG. 6
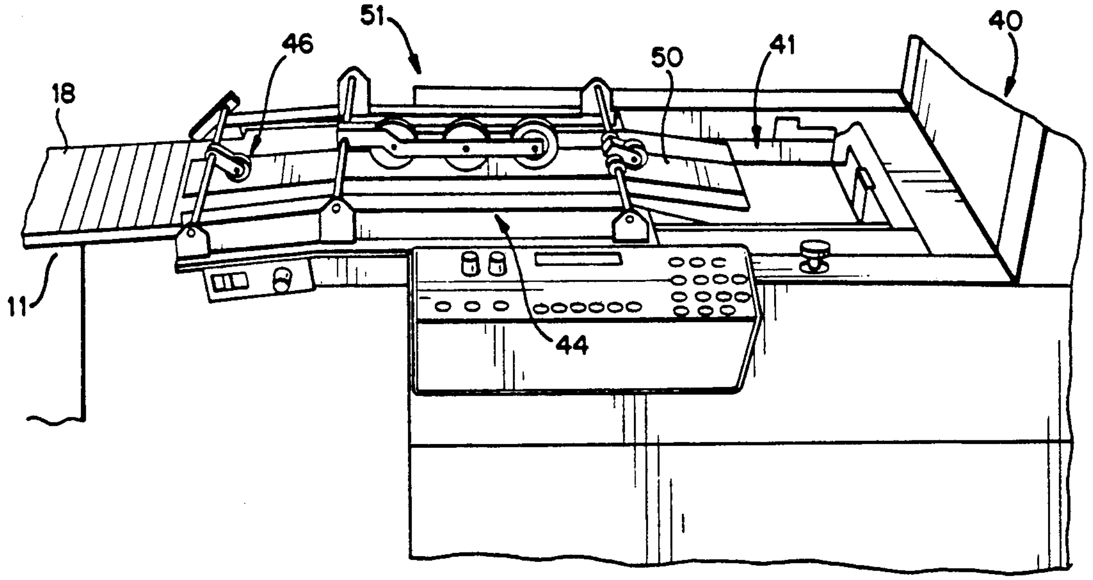

DETACHER TO FOLDER OR PRESSURE SEALER SHINGLE CONVEYOR

BACKGROUND AND SUMMARY OF THE INVENTION

There are many of business form handling equipment, such as pressure sealer systems sold by Moore Business Forms, Inc. under the designation "4800 Sealer System" and described in copending U.S. application Ser. No. 07/417,775, filed Oct. 6, 1989 (the disclosure of which is hereby incorporated by reference herein), which typically act on sheet product to perform various sealing functions and create an end product, such as a mailer. However, there are many circumstances where it is desirable to use such a sealer with business forms in a continuous supply configuration.

Unfortunately, printers which produce forms in continuous supply configuration cannot simply pass the forms through a conventional detacher (such as that sold by Moore Business Forms) and then directly to the sealer since detachers use integral tape delivery conveyors which vary in floor height from model to model, the side edges of the detached forms from detachers are irregular and can have a variation of up to one-half inch depending upon stock, perforations, operator skill, etc.; and the detaching action itself is not completely regular, occasionally resulting in one or more of the detached forms lagging or leading the shingled stack and preventing a clean removal ("pick-off") of the form at the end of the detacher conveyor.

In order to deal with the above mentioned problem, according to the invention a method and apparatus are provided which effect deshingling of the forms between the detacher and the sealer, as well as proper registration of the deshingled forms, so that the forms may be readily acted upon by the sealer and/or intermediate equipment. Preferably, according to the invention a distinct conveyor assembly is operatively connected between the detacher and the sealer so that the detached, shingled forms may be cleanly fed, in registration, directly to a sealer, or first to a hopper and then to a folder before being fed to the sealer.

According to a broad aspect of the present invention, a method of handling business forms having or formable into multiple plies with lines of adhesive between the plies, and originally in a continuous supply configuration, is provided. The method comprises the steps of sequentially and continuously: (a) detaching individual forms from the continuous supply of forms while conveying them in a first direction, to form shingled forms having irregularly positioned side edges moving in the first direction; (b) deshingling the forms, so that they are spaced from each other in the first direction; (c) registering the deshingled forms; and (d) acting on the adhesive lines of the forms to effect sealing of the plies of the forms together.

Steps (b) and (c) are preferably accomplished simultaneously while conveying the forms in the first direction. The individual forms may be folded to form the multiple plies between steps (c) and (d), and in such a situation preferably are fed into the top of a hopper and withdrawn from the bottom of the hopper, prior to folding. Registration may be accomplished by conveying the forms against a single side aligning structure, or funneling them into contact with dual side aligning structures. The deshingling action is accomplished by conveying the forms in the first direction at a much greater speed than the conveying of the shingled forms, e.g. at least about ten times greater speed.

According to another aspect of the present invention, apparatus for accomplishing a method as set forth above is provided. The apparatus may take one of two configurations. In the first configuration, a conveyor belt is angled with respect to a substrate, and has a leading end having a nip roller disposed thereover, the leading end of the conveyor belt grasping each shingled form in turn and conveying it at high speed against an edge aligning structure, and then feeding it directly to the sealer. In a second configuration, the conveyor belt is mounted in the central portion of the substrate with a spring pressed roller thereover, and a plurality of gravity biased rollers, each individual form being conveyed past side edges funneling toward each other and ultimately forming parallel aligning edge structures which guide the forms into the top of the hopper. The forms are withdrawn from the bottom of the hopper to a folder, and then fed to a sealer.

The invention also contemplates a distinct conveyor assembly for operatively connecting a detacher to a sealer for transforming continuous configuration business forms into sealed individual business form mailers. The assembly comprises: a substrate; conveying means mounted in association with the substrat for conveying forms along the substrate in a direction; means for registering the forms during conveyance in the first direction; and means for releasably mounting the substrate between a detacher and a sealer. The conveying and registering means may take the form of either of the two configurations described above.

It is a primary object of the present invention to provide for the simple and effective handling of individual business forms which are originally in a continuous supply configuration so that they may be properly fed to a sealer adapted to act on individual forms. This and other objects of the invention will become clear from an inspection of the detailed description of the invention, and from the appended claims.

BRIEF DESCRIPTION OF THE DRAWINGS

FIG. 1 is a top plan view, with the hold-down mechanisms removed for clarity of illustration, of a first exemplary apparatus according to the present invention;

FIG. 2 is a detail side view, partly in cross section and partly in elevation, of the conveyor component according to the invention which is associated with the apparatus of FIG. 1;

FIG. 5 is a side view of the conveyor component of the apparatus of FIG. 4; and FIG. 6 is a side perspective view of the embodiment of FIGS. 4 and 5.

DETAILED DESCRIPTION OF THE DRAWINGS

Figure 3:
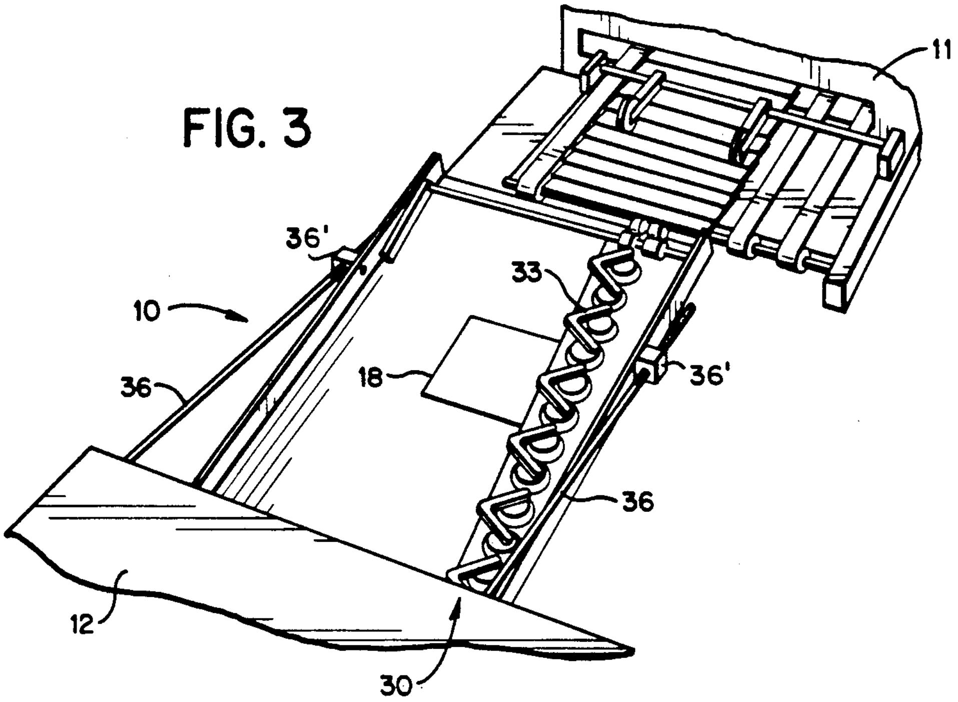
FIG. 3 is a top perspective view of the apparatus of FIGS. 1 and 2.

An apparatus 10 in the first embodiment of the invention illustrated in FIGS. 1 through 3 comprises a distinct conveyor assembly for operatively connecting a detacher 11 to a sealer 12 for transforming continuous configuration business forms into sealed individual business form constructions (typically mailers). The detacher 11 is a conventional detacher, such as sold by Moore Business Forms, and the sealer 12 a conventional sealer. Preferably the sealer 12 is a pressure sealer such as shown in said U.S. pat. application 07/417,775, filed Oct. 6, 1989, but it also may be a conventional heat sealing type sealer.

The detacher II has a conveyor assembly 14 associated therewith with a plurality of spaced conveyor tapes 15 movable over a substrate 16 on which forms 18 are conveyed in a first direction 19. Note that the individual forms 18 are detached when associated with the detaching conveyor 14, and are shingled, and that the side edges thereof are irregular. This is a necessary result of operation of most conventional detachers. The forms are fed in the first direction 19 by the detacher conveying means 14 at a first, relatively slow speed, e.g. about ten feet per minute.

The conveyor assembly 10 according to the present invention includes a conveyor belt 20 operatively associated with a substrate 21 and a registering means comprising an upright side edge structure 22 along one side of the substrate 21, the edge structure 22 being essentially parallel to the first direction 19. The conveyor belt 20 itself extends at an angle with respect to the first direction 19, moving toward the edge structure 22 in the general direction 19. Such a conveying structure is known per se in the art (e.g. see U.S. Pat. No. 2,190,413).

A nip roller 23 is mounted by a shaft 24 to hold each form 18 in contact with the front end of the conveyor belt 20. The nip roller 23 is mounted past the leading edge 25 of the substrate 21, preferably over the front roller 26 for the conveyor belt 20, the front roller 26 also being mounted in front of the leading edge 25 of the substrate 21. A rear roller 27 for the conveyor belt 20 is powered, as by a conventional electric motor 28. The conveyor belt 20 is powered by the motor 28 at a much higher speed than the speed of movement of the shingled forms 18 on the detacher conveyor 14. Typically the speed of the conveyor 20 in order to insure proper deshingling action is at least about ten times greater than the speed of the shingled forms, e.g. about 200 feet per minute.

The assembly 10 also comprises hold-down elements 30 disposed over the conveyor 20 (not seen in FIG. 1 but seen in FIGS. 2 and 3), comprising balls 31 biased by their own weight in each of cages 33 into contact with the top of the belt 20 to hold the form thereat. The biasing force can be changed by changing the weight (density) of the material of which the balls are made (e.g. glass, plastic, steel, etc.).

Typically the forms 18 when shingled have only a slight overlap, which overlap has been exaggerated in FIG. 1 for clarity of illustration. For example, if the forms 18 have a dimension in the first direction 19 of about five and one-half inches, the shingle overlap will be slightly over one-half an inch (e.g. about one-tenth of the dimension in direction 19). Nipping rollers are provided in association with the detacher conveyor 14 at a horizontal spacing of just greater than the form 18 dimension in the direction 19, e.g. just over five and one-half inches in the special case set forth above. The forms 18 either may initially be multi-ply forms with adhesive (e.g. pressure sensitive adhesive) lines between them, or may be formable into multiply forms, e.g. having adhesive lines on the top and/or bottom thereof and then once folded having a multi-ply configuration.

The conveyor assembly 10 is releasably mounted between the detacher 11 and the sealer 12, e.g. by support arms 36 extending from the sealer 12 and connected at one end thereof to the sealer 12 and at the other end thereof to the substrate 21 (e.g. through a threaded nut 36' thereon). The substrate 20 is pivotally mounted at its second end 37, opposite its first end 25, to the sealer 12, as are the ends of the rods 36 adjacent the sealer 12. In this way, by adjusting the length of the arms 36, the height of the leading edge 25 of the substrate can be adjusted to accommodate detachers 11 having different heights of the conveyor discharge 14 thereof.

Utilizing the embodiment of FIG. 1, the detacher 11 detaches continuous supply configuration of business forms to form shingled forms 18 having irregularly positioned side edges while they are moving in the first direction 19. Once the leading edge of the front shingled form 18 passes into contact with the conveyor belt 20 and nip roller 23, it is immediately conveyed at a much higher speed—e g. at least about ten times faster—and during conveyance is held in contact with the conveyor 20 by the weight biased balls 31. Due to the orientation of the conveyor belt 20, each form 18 is in turn automatically moved so that the left side edge thereof (when viewing FIG. 1) is registered with the alignment edge 22, and therefore a single form 18 is fed with desired registration directly into the pressure sealer 12.

Figure 4:
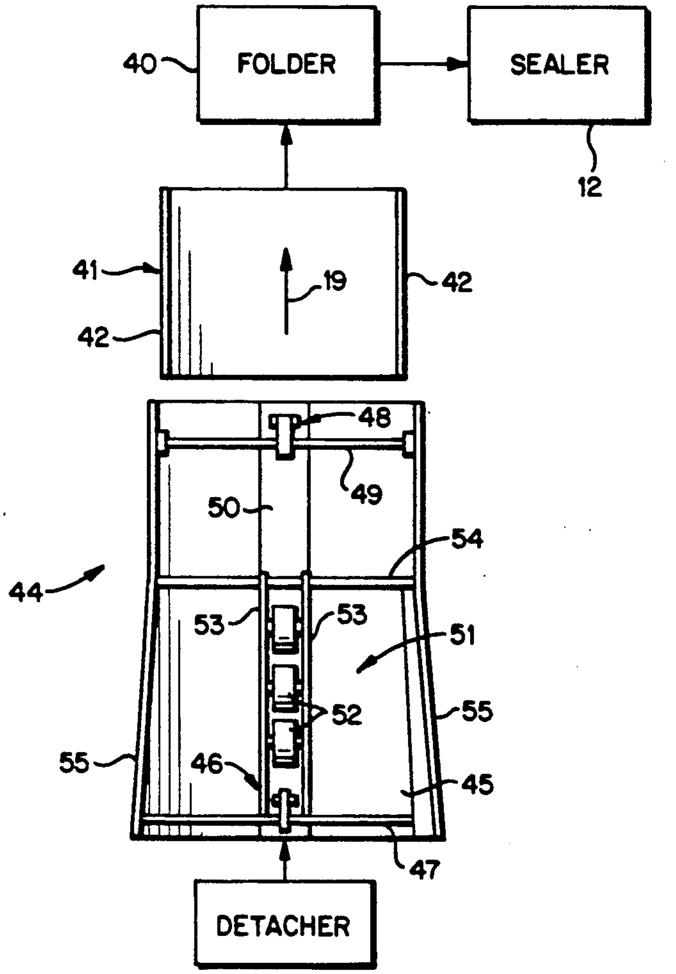
FIG. 4 is a top plan view of a second embodiment of apparatus according to the present invention.

In the embodiment illustrated in FIGS. 4 through 6, the conveyor has been designed to cooperate with a folder 40 which is disposed before the sealer 12 to fold the forms before they are fed to the sealer 12, and preferably includes a hopper 41 having side edges 42 thereof. Forms are fed by the conveyor assembly 44 into the top of the hopper 41 (which is per se conventional), and then are fed from the bottom of the hopper 41 to the folder 40 (as is also conventional). The folder 40 can be any conventional type, such a Moore Business Forms 8158 folder.

The distinct conveyor 44 of the FIGS. 4 through 6 embodiment has a substrate 45, and at the leading edge thereof—adjacent the detacher 11—has a spring pressed roller 46 mounted for rotation about a horizontal axis defined by rod 47, the rod 47 being perpendicular to the first direction 19. At the discharge end of the conveyor assembly 44—that is just before the hopper 41—another spring pressed roller 48 mounted for rotation about the horizontal rod 49, is provided. The rollers 46, 48 are disposed above a conveyor belt 50 moving over the substrate 45. The conveyor belt 50 is essentially aligned with the first direction 19, and disposed at the approximate center of the substrate 45 in a horizontal dimension perpendicular to the first direction 19. In order to hold the forms in contact with the conveyor 50 between the spring pressed rollers 46, 48, the assembly 51 is provided. Assembly 51 includes the gravity or spring biased rollers 52, the rollers 52 being in alignment and mounted by side arms 53, and pivotally disposed due to the pivotal connection of the arms 53 to the shaft 54.

Note that there are upright side edge structures 55 on opposite sides of the substrate 5. As seen most clearly in FIG. 4, the side edges 55 originally funnel (taper) inward slightly, before becoming parallel and being aligned with the first direction 19 (past the rod 54, just prior to the hopper 41). The edge structures 55 preferably are mounted in a conventional manner so that one or both of them is movable with respect to the substrate 45 accommodate forms of different width.

As illustrated in FIG. 5, the conveyor belt 50 has a leading roller 58 an powered roller 59, the roller 59 being powered by an electric motor 60 or the like. As with the FIGS. 1 through 3 embodiment, the motor 60 powers the conveyor 50 at a speed much greater (e.g. at least about ten times greater) than the speed of conveyance of the forms 18 from the detacher 11 discharge conveyor.

In the operation of the FIGS. 4 through 6 embodiment, the shingled forms 18 from the detacher 11 pass so that the leading edges thereof move one at a time to the leading portion of the conveyor belt 50, adjacent the leading spring pressed roller 46. When the leading edge of a form is grasped, it is immediately and quickly conveyed in the first direction 19 at high speed, a deshingling action being effected. The gravity or spring biased roller assembly 51 holds the forms in contact with the conveyor 50, as the edges thereof are registered by the side edge structures 55, the individual forms passing past the discharge spring biased roller 48 into the top of the hopper 41. From the bottom of the hopper 41 they are withdrawn by the folder 40, folded, and fed to the sealer 12.

In the FIGS. 4 through 6 embodiment, the distinct conveyor assembly 44—either with or without the hopper 41—is mounted as a separate support structure between the folder 40 and the detacher 11, or between the hopper 41 and the detacher 11, as the case may be. It has its own support, which may be adjustable to accommodate different heights of the detacher 11 discharge conveyor. Any of a wide variety of conventional mechanisms can be utilized to adjust the height of the substrate 45.

It will thus be seen that according to the present invention a method and apparatus have been provided which effect, or facilitate, proper sealing of individual business forms which are originally in a continuous supply configuration. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and assemblies.

What is claimed is:

1. A method of handling individual business forms having multiple plies, or formable into multiple plies, with lines of adhesive between the plies, the forms preexisting originally in a continuous supply configuration; comprising the steps of sequentially and continuously:
   (a) detaching individual forms from the continuous supply of forms while conveying them in a first direction, to form shingled forms having irregularly positioned side edges moving in the first direction;
   (b) deshingling the forms, so that they are spaced from each other in the first direction;
   (c) registering the desingled forms; and
   (d) acting on the adhesive lines of the desingled individual forms to effect sealing of the plies of each of the forms together.

2. A method as recited in claim 1 wherein steps (b) and (c) are accomplished simultaneously while conveying the forms in the first direction.

3. A method as recited in claim 2 comprising the further step (e), between steps (c) and (d), of folding the individual forms to form the multiple plies.

4. A method as recited in claim 3 comprising the further step (f), between steps (c) and (e), of feeding the individual forms into the top of a hopper, and withdrawing forms from the bottom of the hopper.

5. A method as recited in claim 2 wherein said step (c) is practiced by moving one side of each deshingled form into engagement with an aligning surface.

6. A method as recited in claim 2 wherein step (c) is practiced by moving both side edges of the deshingled form into contact with aligning surfaces.

7. A method as recited in claim 1 wherein the lines of adhesive are pressure sensitive adhesive, and wherein step (d) is practiced to apply pressure to the adhesive lines so as to effect a pressure seal of the adhesive to hold the plies of the forms together.

8. A method as recited in claim 7 wherein step (d) is immediately practiced after step (c), without intervening steps.

9. A method as recited in claim 1 wherein in step (a) the forms are moved in the first direction at a first speed, and wherein step (b) is practiced by grasping a leading edge of each form and then speeding up the movement of the form in the first direction to a second speed at least about ten times greater than the first speed.

* * * * *